(12) United States Patent
Koskan

(10) Patent No.: US 6,181,956 B1
(45) Date of Patent: Jan. 30, 2001

(54) COMMUNICATION DEVICE WITH SELECTIVE MESSAGE TRANSFER TO EARPIECE

(75) Inventor: Patrick D. Koskan, Lake Worth, FL (US)

(73) Assignee: Motorola, Inc., Schaumburg, IL (US)

(*) Notice: Under 35 U.S.C. 154(b), the term of this patent shall be extended for 0 days.

(21) Appl. No.: 09/127,939

(22) Filed: Aug. 3, 1998

(51) Int. Cl.⁷ .................... H04B 1/38; H04M 1/00
(52) U.S. Cl. .............. 455/566; 455/575; 455/11.1; 455/66
(58) Field of Search .................. 455/566, 567, 455/568, 575, 90, 563, 458, 66; 340/825.44, 566, 567, 556

(56) References Cited

U.S. PATENT DOCUMENTS

| | | | |
|---|---|---|---|
| 4,803,487 | * 2/1989 | Willard et al. | 340/825.44 |
| 5,404,577 | * 4/1995 | Zuckerman et al. | 455/66 |
| 5,613,038 | * 3/1997 | Lemaire et al. | 395/2.69 |
| 5,696,500 | * 12/1997 | Diem | 340/825.44 |
| 5,724,410 | * 3/1998 | Parvulesco et al. | 379/88 |
| 5,815,800 | * 9/1998 | Su et al. | 455/31.3 |
| 5,854,984 | * 12/1998 | Burhmann et al. | 455/550 |
| 5,924,044 | * 7/1999 | Vannatta et al. | 455/556 |
| 5,929,774 | * 7/1999 | Charlton | 340/825.44 |
| 5,966,643 | * 10/1999 | Radley | 455/74.1 |
| 6,047,196 | * 4/2000 | Makela et al. | 455/456 |

* cited by examiner

*Primary Examiner*—Fan Tsang
*Assistant Examiner*—Marleau Milord
(74) *Attorney, Agent, or Firm*—Andrew S. Fuller

(57) ABSTRACT

A communication system (120, 125) worn by a user (110) includes a base device (120) and an earpiece (125), which are spatially separated but coupled by a communication link. The base device (120) is operable in first and second operating modes (410). When in the first operating mode, the base device (120) receives and presents text based messages in human readable form to the user via a user interface associated with the base device (420, 430, 435, 440). When in the second operating mode, the received message is converted to audible form, preferably using a text-to-speech synthesizer, and presented to the user via the earpiece (430, 455, 460, 465).

14 Claims, 3 Drawing Sheets

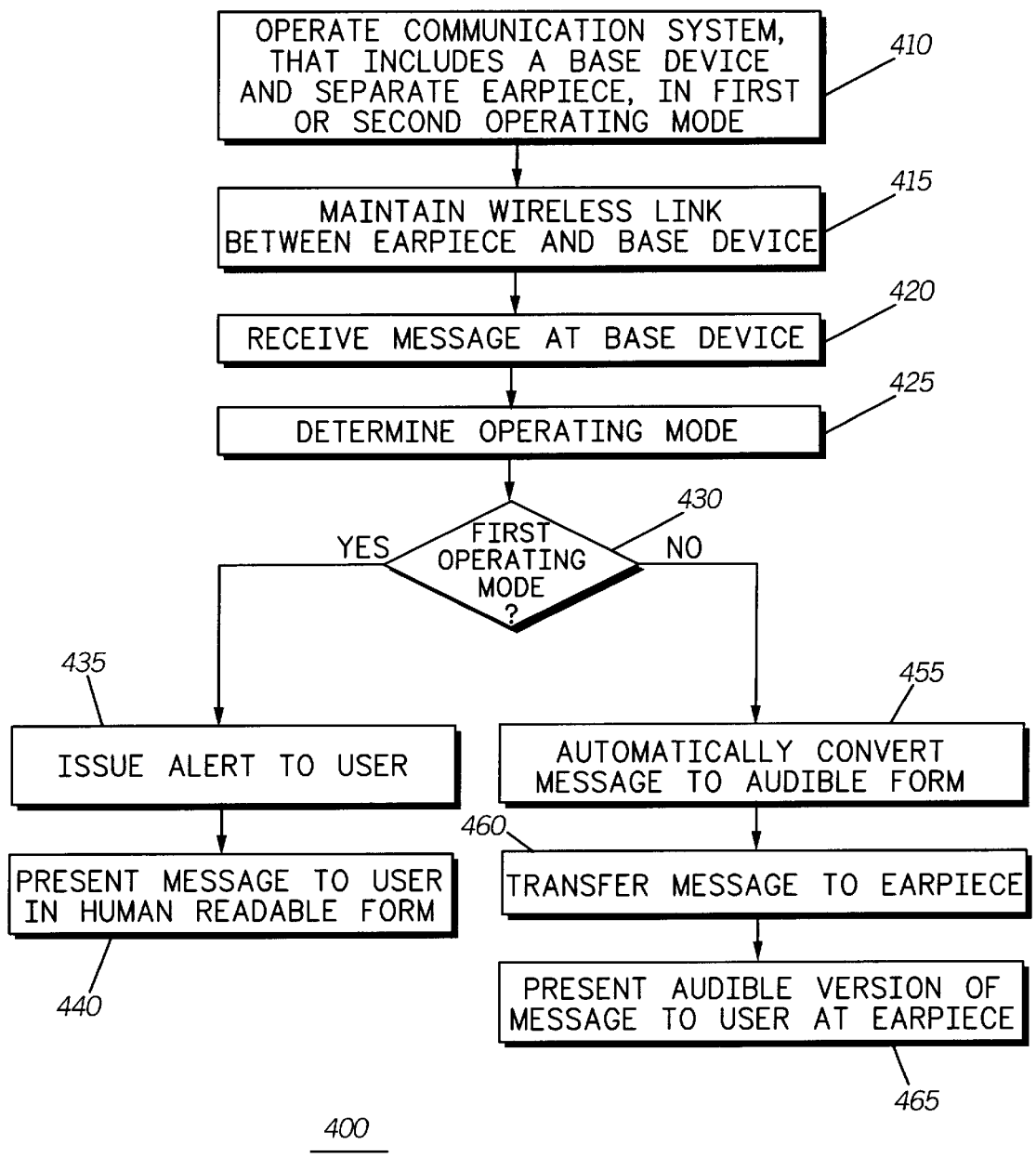

ic messages. When in the first
COMMUNICATION DEVICE WITH SELECTIVE MESSAGE TRANSFER TO EARPIECE

TECHNICAL FIELD

This invention relates in general to communication devices, and more particularly, to wearable personal communication devices.

BACKGROUND OF THE INVENTION

Personal communication devices, such as mobile radio telephones, pagers, and the like, allow individuals on the go to instantly receive important communications. Many such devices are operable to receive alphanumeric messages, including electronic mail messages, and text based short messages. Oftentimes, an individual user is notified of an incoming message by an audible alert, such as a ring or beep, or by a silent alert mechanism, such as a vibrator or flashing light, which is preferred when operating in environments where an audible alert would not be appropriate. Upon receipt of this notification, a user typically accesses the device to retrieve the incoming message.

A problem exists when a user is unable to access a communication device to retrieve an incoming message. For example, environmental or physical impediments may prevent a user from immediately retrieving a message, and thus valuable time may transpire while the message remains undelivered. It would be desirable to have a communication system which could be enabled to deliver a message to the user under circumstances which do not permit the user to access the receiving communication device to retrieve the message. This is particularly needed for retrieving alphanumeric messages. Therefore, a new personal communication system with an alternative message retrieval system is needed.

BRIEF DESCRIPTION OF THE DRAWINGS

FIG. 4 is a flowchart of procedures used for selective transfer of messages between the base device and the earpiece, in accordance with the present invention.

DETAILED DESCRIPTION OF THE PREFERRED EMBODIMENT

Figure 1:
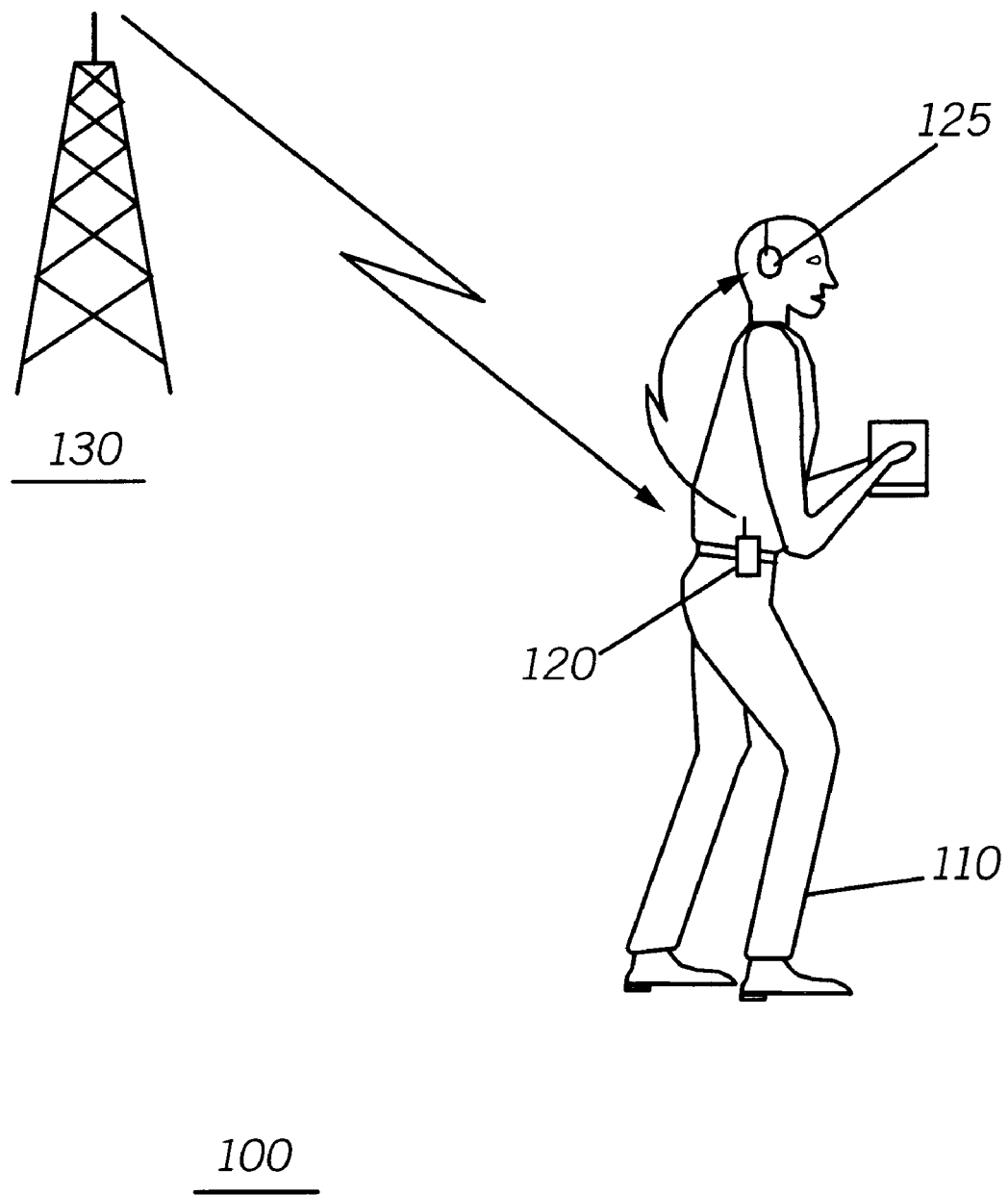
FIG. 1 is a pictorial representation of an individual having a body worn communication system, including a base device and an earpiece, in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention provides for a communication system worn by a user, that selectively presents messages through an at-the-ear device. The communication system includes an earpiece, and a base device an established communication link therebetween. The base device is switchable between first and second operating modes for the presentation of alphanumeric messages. When in the first operating mode, the messages are presented in human readable form at the base device, and when in the second operating mode, the messages are converted to audible form and presented at the earpiece. The device operating mode is preferably user selectable.

FIG. 1 is a pictorial representation of communication environment 100, in accordance with the present invention. Here, an individual 110 is shown wearing a communication system 120, 125 that includes two body worn components, namely, a base communication device 120, and an at-the-ear device or earpiece 125. The base device 120 and the earpiece 125 are spatially separated and a wireless communication link couples both devices 120, 125. The base device 120 receives communications from a remote transmitter 130 for presentation to the user, and selectively transfers messages to the earpiece 125.

Figure 2:
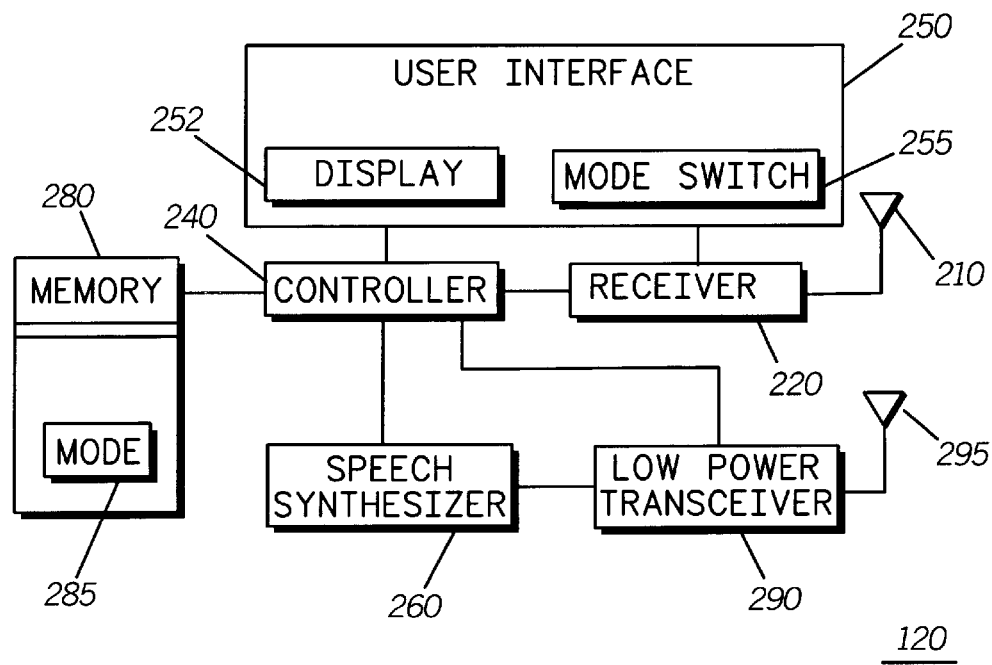
FIG. 2 is a block diagram highlighting significant functional blocks of the base device, in accordance with the present invention.

FIG. 2 is a block diagram of the base device 120, in accordance with the present invention. Preferably, the base device is a selective call receiver, such as a mobile telephone, paging device, or the like, operable to receive alphanumeric text messages over a wireless radio frequency channel, and to present such messages in human readable form to the user. In the preferred embodiment, the base device 120 is a radio telephone with text based short message service. An antenna 210 receives radio frequency signals over the airwaves, and couples these signals to a receiver 220 that decodes and outputs a received message. The receiver is coupled to a controller 240 that provides overall operational control for the device 120. A user interface 250 is coupled to the receiver 220 and to the controller 240. The user interface 250 includes a display 252 and a selectable mode switch 255 that is manipulable by the user. The controller 240 operates under instructions stored in a coupled memory 280 to display received messages on the display 252. The memory 280 is also used for storing the received message in preparation for transfer to the earpiece.

The base device 120 also includes components to support selective transfer of messages to the earpiece. Particularly, the selectable mode switch 255 is operable by a user to select an operating mode for the base device. The operating mode is stored in a location 285 in memory 280 and specifies either a first mode in which messages received are presented at the base device, or a second mode in which messages received are converted to audible form and presented at the earpiece. A low power transceiver 290 and coupled antenna 295 provide a wireless communication link between the base device 120 and the earpiece 125. A speech synthesizer 260 is coupled to the controller 240, and to the low power transceiver 290. The speech synthesizer is operable to convert alphanumeric text messages to speech data.

Figure 3:
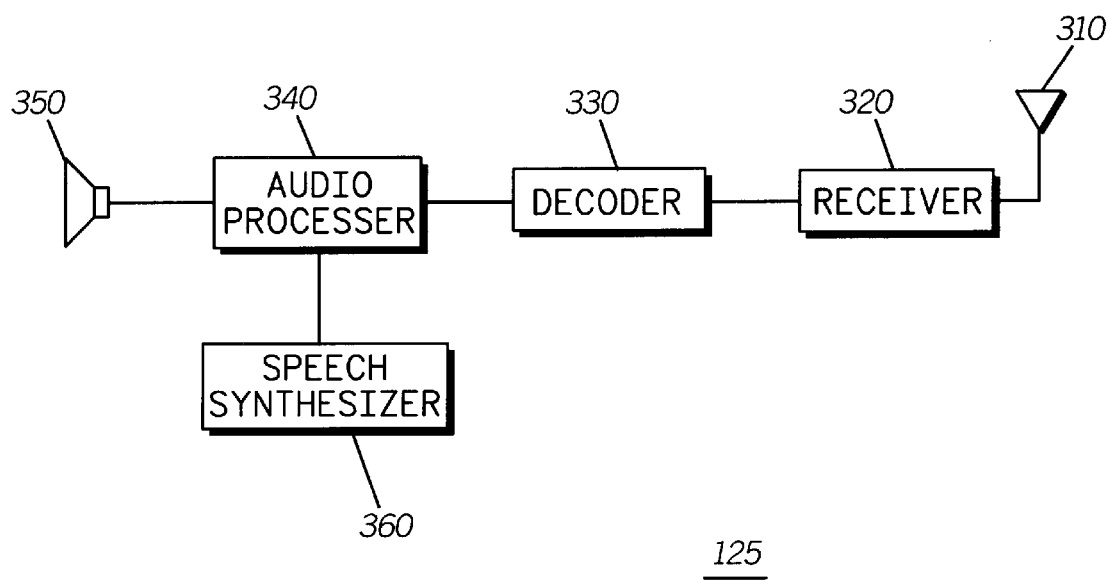
FIG. 3 is a block diagram highlighting significant functional blocks of the earpiece, in accordance with the present invention.

FIG. 3 shows function blocks of the earpiece device 125 that are significant to the present invention. A receiver 320 is coupled to an antenna 310 to receive radio frequency signals. The received signals are decoded by a decoder 330, and the decoded signals provided to an audio processor 340. An audio output device, in the form of speaker 350, is coupled to the audio processor 340 to render messages in audible form. In one embodiment, the audio processor 340 interfaces with a speech synthesizer 360 to generate audio signals from text based digital messages. The speech synthesis function may also be provided in the base device 120.

According to the invention, the communication system is operable in first and second alternative operating modes based on the selectable mode switch. When in the first operating mode, the communication system routes a received message to the user interface, so as to present the received message in human readable form to the user. When in the second operating mode, the communication system presents the received message in audible form to the user via the audio output of the earpiece. In this second mode, the base device, the earpiece device, and the speech synthesizer cooperate with each other to convert the alphanumeric message to audio, and to output the audio at the earpiece device. Preferably, the speech synthesizer is automatically enabled, when in the second operating mode, to convert the received message to audible form. In one embodiment, the base device automatically switches the second operating mode based on a characteristic of the received message, such as on a keyword present in the received message, or a message type indicator.

FIG. 4 shows a flowchart of procedures 400 used by the communication system 120, 125 to receive and present messages to a user. As noted earlier, the communication system, including the base device and separate earpiece, operates in one of two operating modes, step 410. Preferably, a wireless communication link is maintained between the earpiece and the base device, step 415. When a message is received via the base device, step 420, a determination is made whether the base device is operating in the first or second operating modes, step 425. In the first operating mode, an alert is issued to the user, such as by an audible beep, message light or the like, when the message is received, steps 430, 435. The message is presented, on demand, to the user in human readable form on the display of the base device, such as by displaying the message in alphanumeric format.

In the second operating mode, the base device automatically converts the message to audible form, and transfers the message to the earpiece, steps 430, 455, 460. A speech synthesizer at the base communication device or at the earpiece converts the message to speech data, which is then presented in audible form. The audible version of the message is presented to the user at the earpiece, step 465. Preferably, in this mode, presentation of the message at the base device, as well as audible alerts at the base device, are suppressed.

The present invention offers significant advantages, particularly in circumstances which do not permit the user to access the receiving communication device to retrieve the message. By selectively transferring messages to an at-the-ear device and present these messages in audible form, text based messages, which would otherwise remain undelivered for some time, can be delivered without delay, thus enabling users to respond more quickly to important messages.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A communication system worn by a user and operable for receiving and presenting a message, comprising:
an earpiece having an audio output;
a base device spatially separated from the earpiece and having a communication link therewith, the base device comprising:
a receiver having an output of a digitally encoded text message representing a received message;
a user interface coupled to the receiver; and
a selectable mode switch;
wherein the base device is operable in first and second operating modes based on the selectable mode switch, such that when in the first operating mode, the base device presents the received message as in human readable form to the user via the user interface, and when in the second operating mode, the base device transfers the received message to the earpiece for presentation in audible form to the user via the audio output of the earpiece, the base device being operable to automatic switch from the first operating mode to the second operating mode based on an indicator received with the received message.

2. The communication system of claim 1, wherein the earpiece and base device have a wireless link therebetween.

3. The communication system of claim 1, wherein the base device comprises a radio telephone.

4. The communication system of claim 1, wherein the base device comprises a selective call receiver.

5. The communication system of claim 1, further comprising a speech synthesizer that converts alphanumeric messages to speech data, wherein the received message is encoded in alphanumeric format and the speech synthesizer is automatically enabled when in the second operating mode to convert the received message to audible form.

6. The communication system of claim 1, wherein the base device automatically switches the second operating mode based on a keyword present in the received message.

7. The communication system of claim 1, wherein the base device has a memory storage area for storing the received message for transfer to the earpiece.

8. A communication system worn by a user for receiving and presenting an alphanumeric message, comprising:
a speech synthesizer that converts alphanumeric messages to speech data;
a earpiece device having an audio output;
a base device spatially separated from the earpiece device and having a wireless link therewith, the base device comprising a display, and a receiver coupled to the display, the base device having first and second operation modes that is automatically selectable based on an indicator associated with the alphanumeric message, wherein:
when in the first operation mode, the base device operates to route the alphanumeric message for presentation on the display; and
when in the second operation mode, the base device, the earpiece device, and the speech synthesizer cooperate with each other to convert the alphanumeric message to audio, and to output the audio at the earpiece device.

9. In a communication system having an earpiece and a base communication device worn by a user, a method of receiving and presenting a message, comprising the steps of:
receiving a digitally encoded text message via the base communication device;
selecting a first or second operating mode for the base communication device based on an indicator received with the message;
when the base communication device is operating in the first operating mode, presenting the message in human readable form to the user at the base communication device;
when the base communication device is operating in the second operating mode:
suppressing presentation of the message at the base communication device;

transferring the message to the earpiece; and presenting the message to the user in audible form at the earpiece.

10. The method of claim 9, wherein the step of presenting the message to the user in audible form comprises the step of processing the message through a speech synthesizer at the base communication device.

11. The method of claim 10, wherein the step of processing the message through a speech synthesizer comprises the step of operating the speech synthesizer at the earpiece.

12. The method of claim 11, wherein the step of presenting the message in human readable form comprises the step of displaying the message in alphanumeric format.

13. The method of claim 11, further comprising the step of maintaining a wireless link between the base communication device and the earpiece.

14. In a communication system worn by a user and comprising an earpiece and a selective call receiver, a method comprising the steps of:

maintaining a wireless link between the earpiece and the selective call receiver;

receiving a digitally encoded text message via the selective call receiver;

automatically configuring the selective call receiver to operate in a first or second operating mode depending on an indicator associated with the message;

when configured to operate in the first operating mode:
issuing an alert to the user upon receipt of the message;
presenting the message in human readable form to the user at the selective call receiver;

when configured to operate in the second operating mode:
automatically converting the message to audible form;
transferring the converted message to the earpiece; and
presenting the converted message to the user in audible form at the earpiece.

* * * * *